United States Patent [19]

Albarda et al.

[11] Patent Number: 4,901,197

[45] Date of Patent: Feb. 13, 1990

[54] SENSOR FOR CAPACITIVELY MEASURING PRESSURE IN A GAS

[75] Inventors: Scato Albarda, Gross Schenkenberg; Werner Thoren; Johannes Lagois, both of Lübeck; Johann Otten, Bad Schwartau, all of Fed. Rep. of Germany

[73] Assignee: Drägerwerk Aktiengesellschaft, Lübeck, Fed. Rep. of Germany

[21] Appl. No.: 320,164

[22] Filed: Mar. 7, 1989

[30] Foreign Application Priority Data

Mar. 31, 1988 [DE] Fed. Rep. of Germany ....... 3811047

[51] Int. Cl.⁴ .......................... H01G 7/00; H01J 7/44
[52] U.S. Cl. ...................................... 361/283; 315/58
[58] Field of Search .................. 73/718, 724; 361/283; 315/58

[56] References Cited

U.S. PATENT DOCUMENTS

| | | | |
|---|---|---|---|
| 2,725,501 | 11/1955 | Sihvonen | 361/283 X |
| 4,287,553 | 9/1981 | Braunlich | 361/283 |
| 4,735,098 | 4/1988 | Kavli et al. | 73/718 |

FOREIGN PATENT DOCUMENTS

| | | | |
|---|---|---|---|
| 0160713 | 11/1985 | European Pat. Off. | |
| 1394236 | 5/1975 | United Kingdom | 361/283 |

*Primary Examiner*—Donald A. Griffin
*Attorney, Agent, or Firm*—Walter Ottesen

[57] ABSTRACT

The invention is directed to a sensor for making capacitive measurements of the pressure in gases and contains two measuring electrodes conjointly defining a capacitor and arranged in spaced relationship to each other. This sensor is improved such that a pressure measurement is possible without deformable parts. Long-term drift free measurements can be carried out with even the smallest electrode spacing being realized so that miniature sensors can be provided. The intermediate space between the electrodes is accessible to the gas to be investigated and has electrically insulating spacers between the electrodes. The spacers determine the spacing between the electrodes and maintains the electrode spacing during the measurement.

11 Claims, 2 Drawing Sheets

SENSOR FOR CAPACITIVELY MEASURING PRESSURE IN A GAS

FIELD OF THE INVENTION

The invention relates to a sensor for capacitively measuring pressure in a gas. The sensor includes two measuring electrodes which are arranged so as to be spaced from each other and conjointly define a capacitor.

BACKGROUND OF THE INVENTION

A sensor of the kind described above is disclosed in U.S. Pat. No. 4,609,966 incorporated herein by reference. In this sensor, a stationary capacitor electrode is applied to a substrate and a movable membrane electrode is attached opposite to the stationary capacitor electrode at a predetermined spacing therefrom. The two electrodes enclose a chamber with their respective edges which is sealed with respect to the gas atmosphere to be measured. The chamber is under a non-changeable pressure. The movable membrane is subjected to the gas atmosphere to be measured so that under changing pressure conditions it takes on a spacing in correspondence thereto with respect to the stationary electrode. The movements of the elastic membrane are taken up as capacitance changes and are processed as a signal for the pressure of the gas to be investigated.

In this known configuration, the quality of the measurement is dependent upon the movability of the membrane which, in turn, is a function of the membrane thickness. In order to be able to measure even slight pressure changes, a membrane as thin as possible is required which however is sensitive with respect to mechanical damage. A deformable membrane has the disadvantage with respect to making measurements that it displays flow characteristics under the force effect of the gas to be investigated so that its measuring characteristic changes over a long period of time in a manner which cannot be predicted. This becomes manifest in an undesired drift behavior of the measurement signal.

Furthermore, the requirement must be satisfied that the sealed chamber does not develop any leaks during the long-term use of the sensor. Considerable difficulties are encountered in fixing a spacing for the quiescent condition which remains constant over the length of the elastic membrane. Membrane spacings in the micrometer range can be achieved only with difficulty and above all cannot be maintained constant. Because of their capacitive effect, these membrane distances could otherwise lead to small sizes of the apparatus.

SUMMARY OF THE INVENTION

It is an object of the invention to provide a sensor of the kind described above which is improved such that a pressure measurement is possible without deformable parts so that a long-term drift-free measurement can be carried out and with which even the smallest electrode spacings can be realized to thereby make a miniature sensor realizable.

According to a feature of the sensor of the invention, the intermediate space between the electrodes is accessible to the gas to be investigated and spacers are provided between the electrodes and are located in the intermediate space therebetween to which the gas to be investigated is accessible. The spacers are electrically insulating and determine the electrode spacing and maintain this spacing during the measurement.

A spacing which is constant during the measurement is provided between the electrodes by the spacers. In this connection, it is not so important that this spacing be the same at all locations, instead, it is important that the spacing which is once set remains unchanged. The capacitance of the capacitor changes then because of the change in the dielectric constant of the gas under pressure. The gas to be investigated is present at both sides of the measuring electrodes so that no deformation occurs because of the balance of forces. By selecting a suitable and preferable process, the spacers can be dimensioned in the micrometer range. These processes include structural etching of an oxide coating; direct Si-Si bonding for the case that silicon is used as a carrier. In this connection, reference may be made to the article of J. B. Lasky in Applied Physics Letters (48), 1 (1986), pages 78 to 90.

By realizing the smallest possible spacing, the effective measuring surfaces of the electrodes can be selected so as to be small without the capacitance and thereby the measuring signal being reduced. This makes very small configurations of a sensor possible and opens up use possibilities at measurement locations having the smallest dimensions. With the isostatic loading of the electrodes, measurements of high pressures (300 to 500 bar) are possible without danger of destroying the sensor.

An especially suitable form of the spacer is provided by the columns connecting the electrodes and disposed in the intermediate space. The columns can be provided at selected locations of the electrode surfaces in accordance with strength and stability considerations and make possible the unimpeded access to the intermediate space by the gas to be investigated.

A realization for the condenser which is likewise easily realizable comprises configuring the electrodes as metallized ceramic plates which are held in spaced relationship to each other by means of non-conducting ceramic struts. The connection between the ceramic struts and the electrodes is achieved by means of a glass melt.

An especially simple and precise realization is achieved when the spacers are etched out of a layer of silicon dioxide which is applied to one of the two electrodes. The remaining connections to be established between the spacers and the layer still remaining, can be produced again with the aid of the process of direct silicon to silicon bonding.

A further preferred possibility for the configuration of the spacers is realized in that they are formed as a porous matrix structure filling out the intermediate space and preferably made of aluminum oxide ($Al_2O_3$). A porous matrix structure is especially suitable for such cases where the electrode surfaces are not planar and instead constitute an arcuate surface or a curved form realizable in many ways.

To provide a realization of the electrodes which is simple to manufacture, these electrodes are configured as layers applied to the matrix structure such as by vapor deposition.

To increase the measurement sensitivity, it is advantageous to provide a plurality of sensors in the form of layers of spacers and the electrodes corresponding thereto one atop the other. Such a parallel circuit of a plurality of sensors can be utilized when measuring small pressures to improve the signal-to-noise ratio.

Capacitance measurements are as a rule very complex. For this reason and if an adequate number of precise measurement results are to be obtained, the electrodes are configured as part of a field effect transistor to facilitate the measurement task. The one electrode can then be the channel and the other electrode the gate of this FET. In this manner, short signal paths from the electrodes to the amplifier are realized which make possible the greatest reduction of disturbance signals which would otherwise stray in via the long signal lines.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
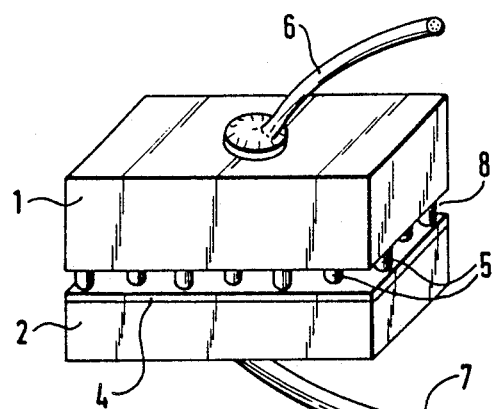
FIG. 1 is a perspective view of an individual measuring sensor according to the invention.

FIG. 1 shows a measuring sensor which comprises two plate-shaped electrodes (1, 2) made of silicon. One of these two electrodes is provided with an oxide layer 4 on one of its surfaces. From this oxide layer 4, a plurality of cylindrically-shaped spacers 5 are formed by means of structural etching. The spacers 5 hold the mutually adjacent surfaces of the electrodes (1, 2) in a fixed spacing to each other. The parts described above are united to a solid sensing body by means of bonding. Electrical feed lines (6, 7) are attached to the electrodes (1, 2) for applying the voltage and for taking off the corresponding measuring signal. The intermediate space 8 between the electrodes (1, 2) is filled with the gas to be investigated and this can be done, for example, by a simple placement of the sensor in this gas.

The sensor of the invention can, for example, be used in breathing equipment wherein the pressure of the breathing gas is to be measured. This measurement can be performed in the gas supply or inside the breathing gas tubes.

Figure 2:
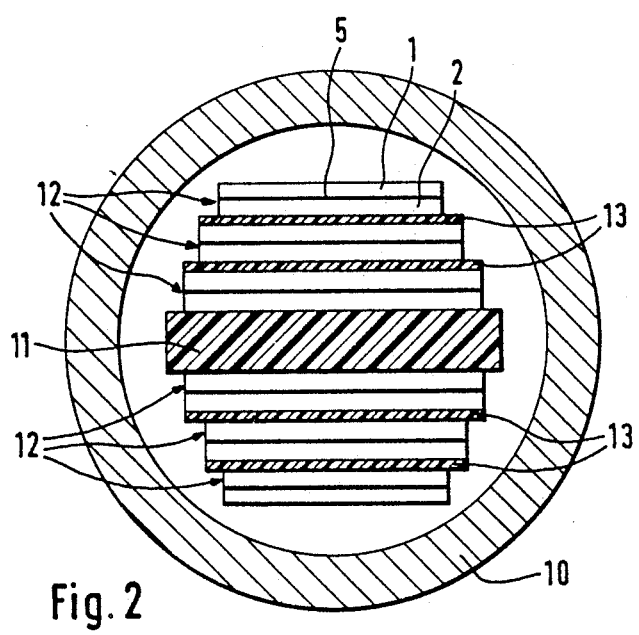
FIG. 2 is a parallel connection of a plurality of measurement sensors.

A cylindrical housing 10 is shown in section in FIG. 2. A multi-layered arrangement of a plurality of sensors connected in parallel is accommodated in the interior of the housing. A carrier plate 11 made of insulating material has three layers of a sensor 12 on each of its two sides. The configuration of the sensor corresponds to that shown in FIG. 1. Each sensor 12 is separated from its next adjacent sensor by means of an insulating layer 13. The two electrodes (1, 2) of each sensor 12 are held at a defined spacing from each other by means of the spacers 5 so that the gas to be measured and present in the interior of housing 10 can penetrate into the intermediate space between the electrodes (1, 2). The spacers 5 are schematically illustrated in FIG. 2 in the form of a line.

Figure 3:
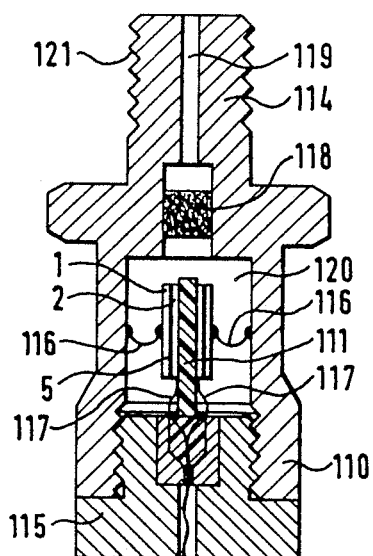
FIG. 3 is an elevation view, in section, of a measurement sensor disposed in a housing; and, FIG. 4 is an other embodiment of the measuring sensor according to the invention wherein the configuration of the sensor includes a field effect transistor.

The sensor of FIG. 3 is likewise accommodated on both sides of a carrier plate 111 and is disposed in a sensor housing 110. The sensor housing 110 has a gas inlet stub 114 on one end thereof and carries a base 115 for threadably engaging the housing 110. Each sensor has the two electrodes (1, 2) and the spacers 5. The electrodes 1 are connected with the housing 110 via contact lines 116 and the electrodes 2 are lead through the base 115 to the outside via signal lines 117 to an evaluation unit (not shown). The gas inlet stub 114 has an inlet channel 119 provided with a filter 118 via which the gas to be detected can be cleaned of possible contamination and reach the sensing chamber 120. The outer end of the gas inlet stub 114 is provided with a screw thread 121 for mounting the housing 110 at a position suitable for taking a sample. The base 115 is threadably engaged with the housing 110 as shown.

Figure 4:
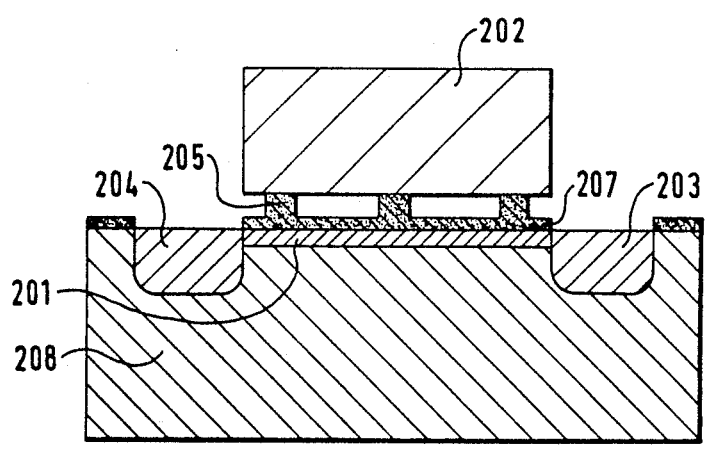

Finally, FIG. 4 shows an embodiment wherein the one electrode is defined by the gate 202 of the field effect transistor and the other electrode is constituted by the channel 201 of this field effect transistor. The channel 201 is the connecting region between the p-conducting source 203 and the likewise p-conducting drain 204. The spacers 205 are etched from a silicon dioxide layer 207 applied to an n-conducting silicon substrate 208. Gate 202, channel 201, source 203 and drain 204 are all provided with electrical connecting terminals (not shown).

It is understood that the foregoing description is that of the preferred embodiments of the invention and that various changes and modifications may be made thereto without departing from the spirit and scope of the invention as defined in the appended claims.

What is claimed is:

1. A sensor for capacitively measuring the pressure of a gas, the sensor comprising:
   two mutually adjacent measuring electrodes arranged in the gas and being spaced apart so as to conjointly define an intermediate space therebetween for receiving the gas to be investigated therein; and,
   a plurality of electrically insulating spacers interposed between said electrodes for determining the electrode spacing therebetween and for maintaining said electrode spacing during the measurement while at the same time permitting the gas to reach every location between said electrodes not occupied by said spacers thereby preventing a pressure difference to form across said sensor.

2. The sensor of claim 1, said spacers being respective columns each of which interconnects said electrodes.

3. The sensor of claim 1, said electrodes being respective metallized ceramic plates; and, said spacers being respective ceramic rods and each of said rods having respective ends connected by means of a glass-melt bond to corresponding ones of said ceramic plates.

4. The sensor of claim 1, each of said spacers having respective ends connected to corresponding ones of said electrodes by a direct silicon-silicon bond.

5. The sensor of claim 1, comprising a field effect transistor; one of said electrodes being the channel of said field effect transistor and the other one of said electrodes being the gate of said field effect transistor.

6. A sensor for capacitively measuring the pressure of a gas, the sensor comprising:
   two mutually adjacent measuring electrodes spaced apart so as to conjointly define an intermediate space therebetween for receiving a gas to be investigated;
   a plurality of electrically insulating spacers interposed between said electrodes for determining the electrode spacing therebetween and for maintaining said electrode spacing during the measurement; and, said spacers being etched from a silicon dioxide layer applied to one of said electrodes.

7. The sensor of claim 6, each of said spacers having respective ends connected to corresponding ones of said electrodes by a direct silicon-silicon bond.

8. A sensor for capacitively measuring the pressure of a gas, the sensor comprising:
   two mutually adjacent measuring electrodes spaced apart so as to conjointly define an intermediate space therebetween for receiving a gas to be investigated; and,
   a porous matrix structure filling out said intermediate space between said electrodes and defining a multiplicity of pores for receiving the gas to be measured.

9. The sensor of claim 8, said porous matrix structure being made of aluminum oxide.

10. The sensor of claim 8, said porous matrix having mutually opposite sides facing away from each other; and, said electrodes being layers applied to said sides, respectively.

11. A composite sensor for capacitively measuring the pressure of a gas, the composite sensor comprising:
   a plurality of sensors, each of said sensors including:
      two mutually adjacent measuring electrodes arranged in the gas and being spaced apart so as to conjointly define an intermediate space therebetween for receiving the gas to be investigated therein; and, a plurality of electrically insulating spacers interposed between said electrodes for determining the electrode spacing therebetween and for maintaining said electrode spacing during the measurement while at the same time permitting the gas to reach every location between the electrodes not occupied by the spacers thereby preventing a pressure difference to form across the sensor;
   said sensors being stacked one atop the other; and,
   insulating means for separating each two mutually adjacent ones of said sensors from each other.

* * * * *